(12) United States Patent
Jiao et al.

(10) Patent No.: US 12,609,632 B2
(45) Date of Patent: Apr. 21, 2026

(54) FILTER SYSTEM AND X-CAPACITOR PROTECTION METHOD THEREOF

(71) Applicant: Delta Electronics (Shanghai) Co., Ltd., Shanghai (CN)

(72) Inventors: Bing Jiao, Shanghai (CN); Yun Hua, Shanghai (CN); Jun Chen, Shanghai (CN); Yansong Lu, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 171 days.

(21) Appl. No.: 18/388,645

(22) Filed: Nov. 10, 2023

(65) Prior Publication Data

US 2024/0171088 A1     May 23, 2024

(30) Foreign Application Priority Data

Nov. 18, 2022 (CN) .......................... 202211448356.2

(51) Int. Cl.
| | |
|---|---|
| *H02M 7/483* | (2007.01) |
| *H02M 1/32* | (2007.01) |
| *H02M 1/44* | (2007.01) |
| *H02M 7/487* | (2007.01) |

(52) U.S. Cl.
CPC ......... *H02M 7/4833* (2021.05); *H02M 1/327* (2021.05); *H02M 1/44* (2013.01); *H02M 7/487* (2013.01)

(58) Field of Classification Search
CPC ...... H02M 7/4833; H02M 1/327; H02M 1/44; H02M 7/487; H02M 1/123; H02M 1/126; Y02E 40/40; H02J 3/01; G01R 27/2605
See application file for complete search history.

(56) References Cited

U.S. PATENT DOCUMENTS

| | | | | |
|---|---|---|---|---|
| 3,555,291 A | * | 1/1971 | Dewey | H03H 7/427 |
| | | | | 333/176 |
| 3,681,612 A | * | 8/1972 | Vogl | H03H 7/0115 |
| | | | | 333/182 |
| 3,683,271 A | * | 8/1972 | Tatsuo | H03H 1/0007 |
| | | | | 333/81 R |

(Continued)

FOREIGN PATENT DOCUMENTS

| | | |
|---|---|---|
| CN | 201639300 U | 11/2010 |
| CN | 202712822 U | 1/2013 |

(Continued)

*Primary Examiner* — Thienvu V Tran
*Assistant Examiner* — Muaamar Qahtan Al-Taweel
(74) *Attorney, Agent, or Firm* — KIRTON McCONKIE; Evan R. Witt

(57) ABSTRACT

The present disclosure provides a filter system including N common mode chokes, N+1 first capacitors, N+1 second capacitors and N+1 third capacitors. Each common mode choke includes a first winding, a second winding, a third winding and an auxiliary winding. In the k-th common mode choke, a second terminal of the k-th first capacitor, a second terminal of the k-th second capacitor and a second terminal of the k-th third capacitor are all electrically connected to a k-th electrical midpoint, and two terminals of the auxiliary winding of the k-th common mode choke are electrically connected to the k-th electrical midpoint and a (k+1)-th electrical midpoint respectively, N is a positive integer and k is a positive integer less than or equal to N.

6 Claims, 9 Drawing Sheets

1

(56) References Cited

U.S. PATENT DOCUMENTS

| | | | | | |
|---|---|---|---|---|---|
| 4,342,013 | A | * | 7/1982 | Kallman | H02H 9/005 |
| | | | | | 177/185 |
| 4,812,669 | A | * | 3/1989 | Takeda | H02J 3/01 |
| | | | | | 323/210 |
| 5,179,362 | A | * | 1/1993 | Okochi | H04B 15/02 |
| | | | | | 333/181 |
| 5,619,079 | A | * | 4/1997 | Wiggins | H03H 1/0007 |
| | | | | | 307/89 |
| 5,677,832 | A | * | 10/1997 | Tissier | H02J 3/01 |
| | | | | | 323/210 |
| 5,969,583 | A | | 10/1999 | Hutchison | |
| 8,270,188 | B1 | * | 9/2012 | Kim | H02M 7/06 |
| | | | | | 307/15 |
| 2007/0211501 | A1 | * | 9/2007 | Zargari | H02M 5/4585 |
| | | | | | 363/39 |

FOREIGN PATENT DOCUMENTS

| | | | |
|---|---|---|---|
| CN | 207819759 | U | 9/2018 |
| CN | 109596894 | A | 4/2019 |
| CN | 210490474 | U | 5/2020 |
| CN | 211508688 | U | 9/2020 |
| CN | 111830402 | A | 10/2020 |
| WO | 2022033634 | A1 | 2/2022 |

* cited by examiner

L2k

3

L1k

L4k

L3k

FILTER SYSTEM AND X-CAPACITOR PROTECTION METHOD THEREOF

CROSS-REFERENCE TO RELATED APPLICATION

This application claims priority to China Patent Application No. 202211448356.2, filed on Nov. 18, 2022, the entire contents of which are incorporated herein by reference for all purposes.

FIELD OF THE INVENTION

The present disclosure relates to a filter system and an X-capacitor protection method thereof, and more particularly to a filter system and an X-capacitor protection method thereof suitable for a three-phase three-wire power grid.

BACKGROUND OF THE INVENTION

For photovoltaic inverter (PVI) and power conditioning system (PCS), the failure of X capacitor causes overheating and fires, resulting in equipment damage and economic losses. For example, the environmental impact of high temperature and high humidity or the system being struck by lightning causes the X capacitor to degrade gradually and causes the capacitance of the X capacitor to attenuate. For the X capacitors with Y-shaped connection, when a capacitance of an X capacitor attenuates, the electrical midpoints of the Y-type connection losses balance, thereby causing the voltage increasement of the X capacitor in one or more phases. Consequently, the X capacitor with the voltage exceeding a standard value may overheat.

The conventional filter system includes multiple sets of X capacitors C disposed independently to each other. As shown in FIG. 1A, the filter system 1' includes three sets of X capacitors C disposed independently to each other. The voltage of each X capacitor in the X capacitors C is sampled to confirm the capacitance. However, the large amount of the voltage sampling units (not shown in the figure) increases the system complexity and wastes sampling resources. For avoiding that, various conventional approaches have been developed, which are explained as follows.

In the first conventional approach, as shown in FIG. 1B, each X capacitor is electrically connected to a power line through a fuse F. Accordingly, when an X capacitor fails, the corresponding fuse F is blown to cut off the faulty X capacitor. However, in this approach, the current capacitance of the X capacitor cannot be confirmed before the X capacitor fails. Moreover, since each X capacitor is electrically connected to a fuse with high withstanding voltage, the cost and the circuit wiring complexity are increased.

In the second conventional approach, as shown in FIG. 1C, a temperature sensor TC is disposed near each set of X capacitors C. Accordingly, when an X capacitor is overheating due to failure, the temperature sensor TC outputs a fault warning message. However, in this approach, the fault warning message is triggered only when the X capacitor has failed, so it cannot achieve an early warning effect.

Therefore, there is a need of providing a filter system and an X-capacitor protection method thereof to obviate the drawbacks encountered from the prior arts.

SUMMARY OF THE INVENTION

It is an object of the present disclosure to provide a filter system and an X-capacitor protection method thereof. In the filter system and the X-capacitor protection method thereof, all the electrical midpoints of capacitors are electrically connected to each other through windings of common mode chokes, thereby balancing the divided voltages of the capacitors in three phases and reducing the damage rate of the capacitors. In addition, since the winding for electrically connecting the electrical midpoints is one winding of the common mode choke and the current passes therethrough is small, the size of the winding is smaller than that of the independent inductor.

In accordance with an aspect of the present disclosure, there is provided a filter system. The filter system is electrically coupled to a three-phase three-wire power grid. The filter system includes a first line, a second line and a third line. The filter system includes N common mode chokes, N+1 first capacitors, N+1 second capacitors, N+1 third capacitors and a detection unit, and N is a positive integer. Each common mode choke includes a first winding, a second winding, a third winding and an auxiliary winding. In the k-th common mode choke, a first terminal and a second terminal of the first winding are electrically connected to a first terminal of the k-th first capacitor and a first terminal of the (k+1)-th first capacitor respectively. A first terminal and a second terminal of the second winding are electrically connected to a first terminal of the k-th second capacitor and a first terminal of the (k+1)-th second capacitor respectively. A first terminal and a second terminal of the third winding are electrically connected to a first terminal of the k-th third capacitor and a first terminal of the (k+1)-th third capacitor respectively. A second terminal of the k-th first capacitor, a second terminal of the k-th second capacitor and a second terminal of the k-th third capacitor are all electrically connected to a k-th electrical midpoint, and a first terminal and a second terminal of the auxiliary winding of the k-th common mode choke are electrically connected to the k-th electrical midpoint and a (k+1)-th electrical midpoint respectively, and k is a positive integer less than or equal to N.

In accordance with an aspect of the present disclosure, there is provided a filter system. The filter system is electrically coupled to a three-phase three-wire power grid. The filter system includes a first line, a second line and a third line, and the filter system includes a first capacitor unit, a second capacitor unit and a common mode choke. Each of the first capacitor unit and the second capacitor unit includes a first capacitor, a second capacitor and a third capacitor. A terminal of the first capacitor, a terminal of the second capacitor and a terminal of the third capacitor are electrically connected to the first line, the second line and the third line respectively. The other terminals of the first capacitor, the second capacitor and the third capacitor in the first capacitor unit are electrically connected to a first electrical midpoint, and the other terminals of the first capacitor, the second capacitor and the third capacitor in the second capacitor unit are electrically connected to a second electrical midpoint. The common mode choke is electrically connected in series between the first capacitor unit and the second capacitor unit. The common mode choke includes an auxiliary winding electrically connected between the first electrical midpoint and the second electrical midpoint.

In accordance with an aspect of the present disclosure, there is provided an X-capacitor protection method of a filter system including steps of: (a) providing a plurality of capacitor units, wherein each capacitor unit includes a first X capacitor, a second X capacitor and a third X capacitor, wherein a terminal of the first X capacitor, a terminal of the second X capacitor and a terminal of the third X capacitor are electrically connected to the first line, the second line and the third line respectively, wherein the other terminal of the first X capacitor, the other terminal of the second X capacitor and the other terminal of the third X capacitor are electrically connected to a corresponding electrical midpoint; (b) providing a plurality of common mode chokes, wherein each of the plurality of common mode chokes has an auxiliary winding; (c) electrically connecting the electrical midpoints corresponding to the adjacent capacitor units through the auxiliary winding; (d) detecting a phase voltage in a phase between the first line, the second line or the third line and one of the electrical midpoints; (e) calculating two phase voltages in another two phases according to the detected phase voltage and two line voltages each between any two of the first line, the second line and the third line; (f) comparing the three phase voltages with a threshold; and (g) outputting a protection signal when any one of the three phase voltages is higher than the threshold.

The above contents of the present invention will become more readily apparent to those ordinarily skilled in the art after reviewing the following detailed description and accompanying drawings, in which:

BRIEF DESCRIPTION OF THE DRAWINGS

FIG. 5 is a schematic perspective view illustrating the first winding, the second winding, the third winding and the auxiliary winding of the common mode choke shown in FIG. 2 and a magnetic core where these windings are wound on;

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1A:
FIG. 1A, FIG. 1B and FIG. 1C are schematic circuit diagrams illustrating conventional filter systems.
Figure 1A:
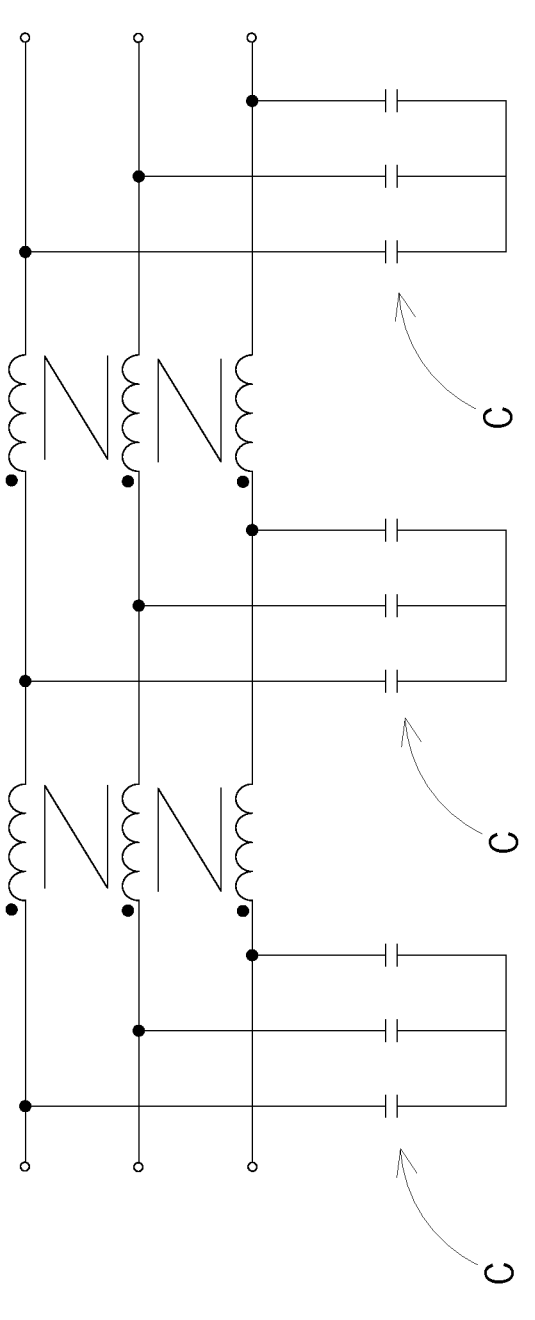
Figure 1B:
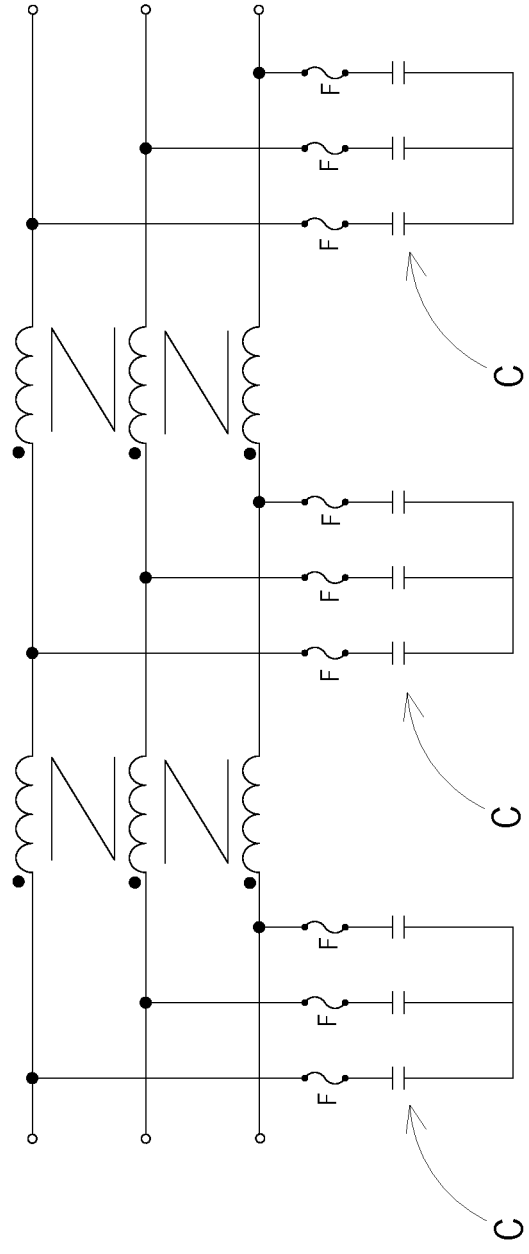
Figure 1C:
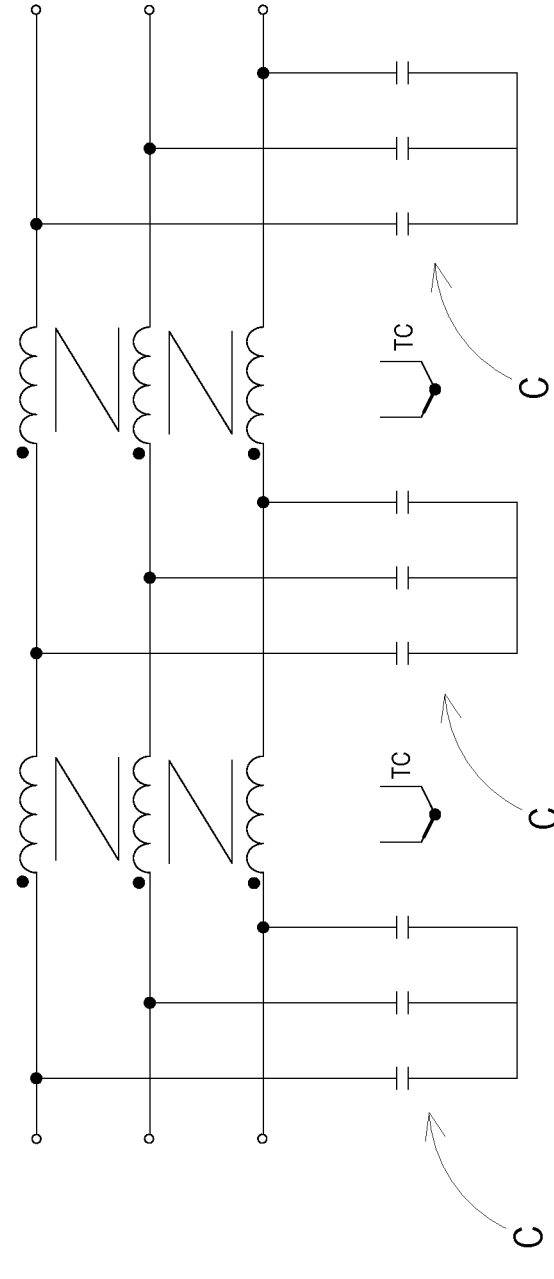
Figure 2:
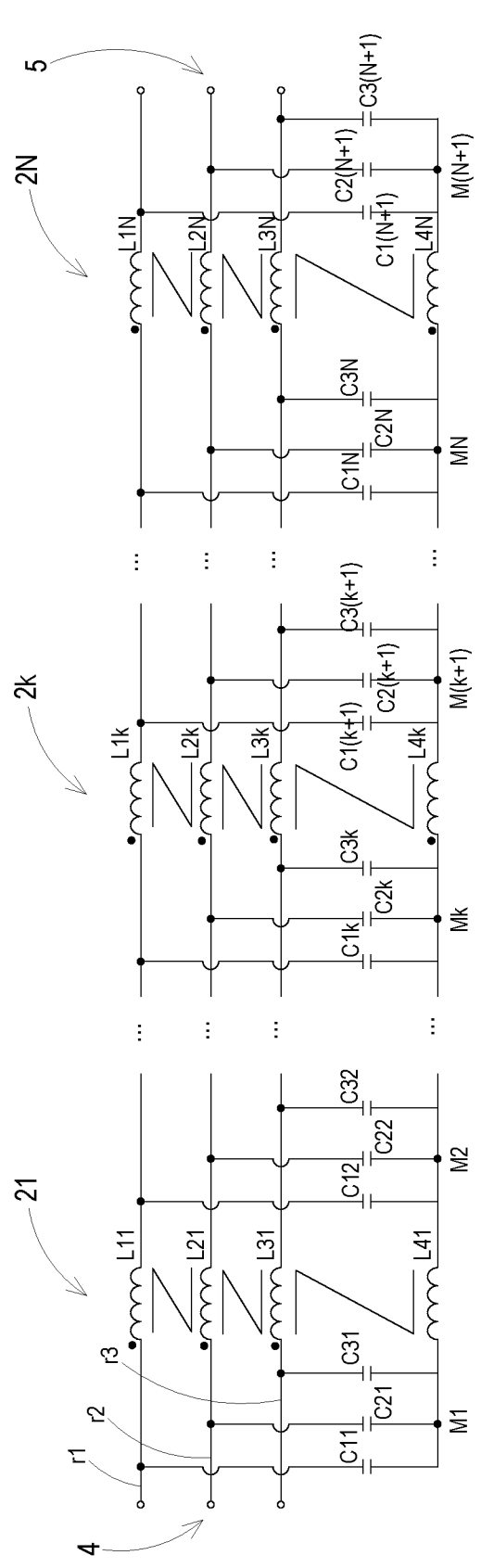
FIG. 2 is a schematic circuit diagram illustrating a filter system according to an embodiment of the present disclosure.

FIG. 2 is a schematic circuit diagram illustrating a filter system 1 according to an embodiment of the present disclosure. As shown in FIG. 2, the filter system 1 is electrically coupled to a three-phase three-wire power grid and includes a first line r1, a second line r2 and a third line r3. The first line r1, the second line r2 and the third line r3 are electrically connected to the three power lines of the three-phase three-wire power grid respectively. The filter system 1 includes N common mode chokes 21-2N, N+1 first capacitors C11-C1(N+1), N+1 second capacitors C21-C2(N+1) and N+1 third capacitors C31-C3(N+1), and N is a positive integer. In an embodiment, the first capacitors C11-C1(N+1), the second capacitors C21-C2(N+1) and the third capacitors C31-C3(N+1) are X capacitors.

Each common mode choke includes a first winding, a second winding, a third winding and an auxiliary winding. In the k-th common mode choke $2k$, the first and second terminals of the first winding L1$k$ are electrically connected to the first terminal of the k-th first capacitor C1$k$ and the first terminal of the (k+1)-th first capacitor C1($k$+1) respectively. The first and second terminals of the second winding L2$k$ are electrically connected to the first terminal of the k-th second capacitor C2$k$ and the first terminal of the (k+1)-th second capacitor C2($k$+1) respectively. The first and the second terminals of the third winding L3$k$ are electrically connected to the first terminal of the k-th third capacitor C3$k$ and the first terminal of the (k+1)-th third capacitor C3($k$+1) respectively. k is a positive integer less than or equal to N.

It should be noted that for the convenience of illustration, the common mode chokes 21, $2k$ and 2N and the corresponding capacitors are shown in FIG. 2. In fact, N may be equal to 1, and correspondingly the common mode chokes 21, $2k$ and 2N are the same common mode choke. Alternatively, N may be equal to 2, and correspondingly the common mode choke $2k$ and the common mode choke 21 or 2N are the same common mode choke.

The second terminal of the k-th first capacitor C1$k$, the second terminal of the k-th second capacitor C2$k$ and the second terminal of the k-th third capacitor C3$k$ are all electrically connected to the k-th electrical midpoint M$k$. The first and second terminals of the auxiliary winding L4$k$ of the k-th common mode choke are electrically connected to the k-th electrical midpoint M$k$ and the (k+1)-th electrical midpoint M($k$+1) respectively. In the k-th common mode choke $2k$, since the auxiliary winding L4$k$ and the other windings L1$k$-L3$k$ are coupled to each other, the high frequency components can be blocked.

The N+1 electrical midpoints M1-M(N+1) are electrically connected to each other through the auxiliary windings L41-L4N. Therefore, when the capacitance of any one of the N+1 first capacitors C11-1(N+1) attenuates, the voltage of other first capacitors of the filter system 1 can be introduced for clamping the divided voltage of the first capacitor with attenuated capacitance, thereby reducing the risk of overvoltage and reducing the maintenance frequency of the system. Similarly, when any second or third capacitor attenuates, the voltage clamping may be performed in the same way to reduce the risk of overvoltage. Since the specific process is the same, the detailed description thereof is omitted herein.

In an embodiment, the first terminal of the 1st first capacitor C11, the first terminal of the 1st second capacitor C21 and the first terminal of the 1st third capacitor C31 are electrically connected to an AC port 4, which is configured to electrically connect to the AC side of the DC/AC converter (not shown). In an embodiment, the first terminal of the (N+1)-th first capacitor C1(N+1), the first terminal of the (N+1)-th second capacitor C2(N+1) and the first terminal of the (N+1)-th third capacitor C3(N+1) are electrically connected to an AC port 5, which is configured to electrically connect to a power grid (not shown). The AC port 5 may be electrically connected to an AC source or an AC load, but not limited thereto.

In the filter system 1 of the present disclosure, all the electrical midpoints of capacitors are electrically connected to each other through the windings of the common mode chokes, thereby balancing the divided voltages of the capacitors in three phases and reducing the damage rate of the capacitors.

The phase voltage between the first line r1 and the k-th electrical midpoint Mk is equal to the phase voltage between the first line r1 and the (k+1)-th electrical midpoint M(k+1) and is regarded as a first phase voltage. The phase voltage between the second line r2 and the k-th electrical midpoint Mk is equal to the phase voltage between the second line r2 and the (k+1)-th electrical midpoint M(k+1) and is regarded as a second phase voltage. The phase voltage between the third line r3 and the k-th electrical midpoint Mk is equal to the phase voltage between the third line r3 and the (k+1)-th electrical midpoint M(k+1) and is regarded as a third phase voltage.

In the conventional filter system coupled to a three-phase three-wire power grid, the multiple sets of X capacitors are independent to each other since there is no neutral line in the three-phase three-wire power grid, making it difficult to protect and monitor the X capacitors. In order to solve the problems encountered in actual engineering applications, an improved filter system 1 is proposed in the present disclosure. In the filter system 1 of the present disclosure, an auxiliary winding is added in the common mode choke to realize the interconnection of common nodes of the multiple sets of X capacitors. Thereby, the phase voltages of multiple sets of X capacitors are clamped to be equal so that the unified protection and monitoring to the multiple sets of X capacitors are realized. For example, the voltage and capacitance of each X capacitor can be obtained by disposing only one phase voltage sampling unit. In addition, the auxiliary winding and the common mode choke are coupled together to block high-frequency components and to prevent the high-frequency components from being injected into the power grid, and thus the stability of the system is ensured. Moreover, an auxiliary winding is added in the inherent common mode choke instead of adding an independent inductor, so the cost and the size are reduced, and the production is easy. Because the three-phase three-wire power grid has no a central line, it is difficult for protecting and monitoring the multiple sets of X capacitors coupled to the three-phase three-wire power grid. The filter system of the present disclosure solves the problem of difficulty in unified protection and monitoring for the multiple sets of X capacitors coupled to the three-phase three-wire power grid. The present disclosure only needs to add an auxiliary winding in the inherent common mode choke, so the cost is reduced, the structure is simple, and it is easy to implement and to apply in engineering.

In the filter system 1 of the present disclosure, the amount of common mode chokes and the amount of capacitor units are flexible. In an embodiment, the filter system includes N common mode chokes 21-2N, N first capacitors C11-C1N, N second capacitors C21-C2N and N third capacitors C31-C3N. In another embodiment, the filter system includes N1 common mode chokes 21-2N1, N2 first capacitors C11-C1N2, N2 second capacitors C21-C2N2 and N2 third capacitors C31-C3N2, and N1 and N2 are positive integers. Therefore, the present disclosure covers various kinds of implementations of the filter system with at least one common mode choke coupled between adjacent capacitor units and connecting electrical midpoints of the adjacent capacitor units to each other.

In an embodiment, the filter system 1 of the present disclosure further includes a detection unit (not shown) and a control unit (not shown). The detection unit detects one of the first phase voltage, the second phase voltage and the third phase voltage. The control unit receives the phase voltage detected by the detection unit and obtains the other two of the first phase voltage, the second phase voltage and the third phase voltage according to the phase voltage detected by the detection unit and two line voltages. The line voltage is a voltage between any two of the first line, the second line and the third line. Each line voltage is provided by a high-level control system (not shown). The control unit compares the first ii) phase voltage, the second phase voltage and the third phase voltage with a threshold. When any one of the first phase voltage, the second phase voltage and the third phase voltage is higher than the threshold, it represents that the capacitance of the capacitor of the corresponding phase attenuates, and the control unit outputs a protection signal. In the filter system 1 of the present disclosure, by detecting the phase voltage of one of the three phases in real time, the voltage across the X capacitor is obtained according to the detected phase voltage and the two line voltages. In specific, please refer to FIG. 2, for example, a phase voltage sampling unit is disposed between the first line r1 and the electrical midpoint M1 for detecting the voltage between the first line r1 and the electrical midpoint M1, i.e., the first phase voltage, and the first phase voltage is equal to the voltage across each of the capacitors C11-C1(N+1). According to the first phase voltage detected by the detection unit and two line voltages (e.g., the line voltage between the first line r1 and the second line r2 or the line voltage between the first line r1 and third line r3), the second phase voltage and the third phase voltage are calculated. The second phase voltage is the voltage between the second line r2 and the electrical midpoints M1/M2 . . . /M(N+1), and the second phase voltage is equal to the voltage across each of the capacitors C21-C2(N+1). The third phase voltage is the voltage between the third line r3 and the electrical midpoints M1/M2 . . . /M(N+1), and the third phase voltage is equal to the voltage across each of the capacitors C31-C3(N+1). The control unit may send a warning message to remind the user to maintain the system when a capacitance of a capacitor in a phase is attenuated, thereby achieving an early warning effect and avoiding the occurrence of the system failure. In an embodiment, the control unit compares the first phase voltage, the second phase voltage and the third phase voltage with a threshold. When any one of the first phase voltage, the second phase voltage and the third phase voltage is higher than the threshold, the control unit outputs a protection signal or a warning signal. The determination of the threshold is related to the amount of X capacitors. In another embodiment, the control unit calculates a capacitance of the first phase capacitor (C11/C12 . . . ) according to the first phase voltage, calculates a capacitance of the second phase capacitor (C21/C22 . . . ) according to the second phase voltage, and calculates a capacitance of the third phase capacitor (C31/C32 . . . ) according to the third phase voltage. The control unit compares the capacitance of the first phase capacitor, the capacitance of the second phase capacitor, the capacitance of the third phase capacitor with a threshold, and a protection signal or a warning signal is output when any one of the capacitances of the phase capacitors is less than the threshold. The control unit may be a local controller or a part of the system controller.

Figure 3:
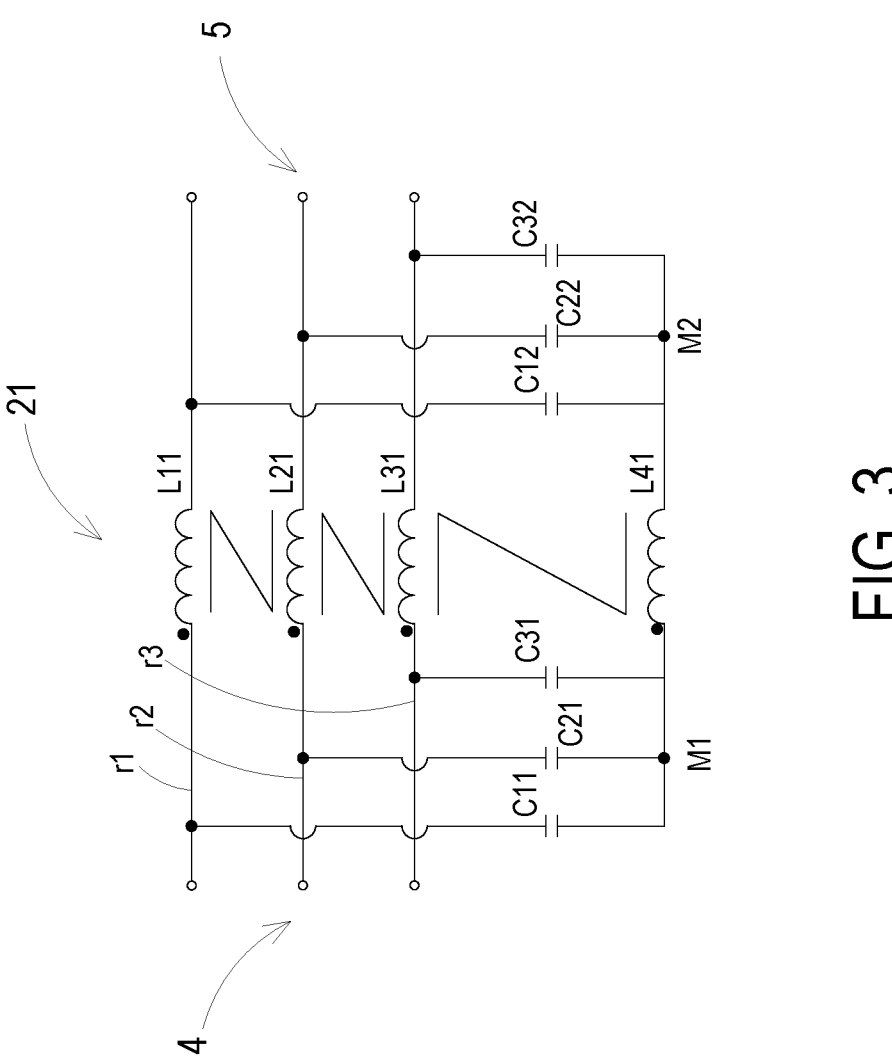
FIG. 3 is a schematic circuit diagram illustrating a filter system according to another embodiment of the present disclosure.
Figure 4:
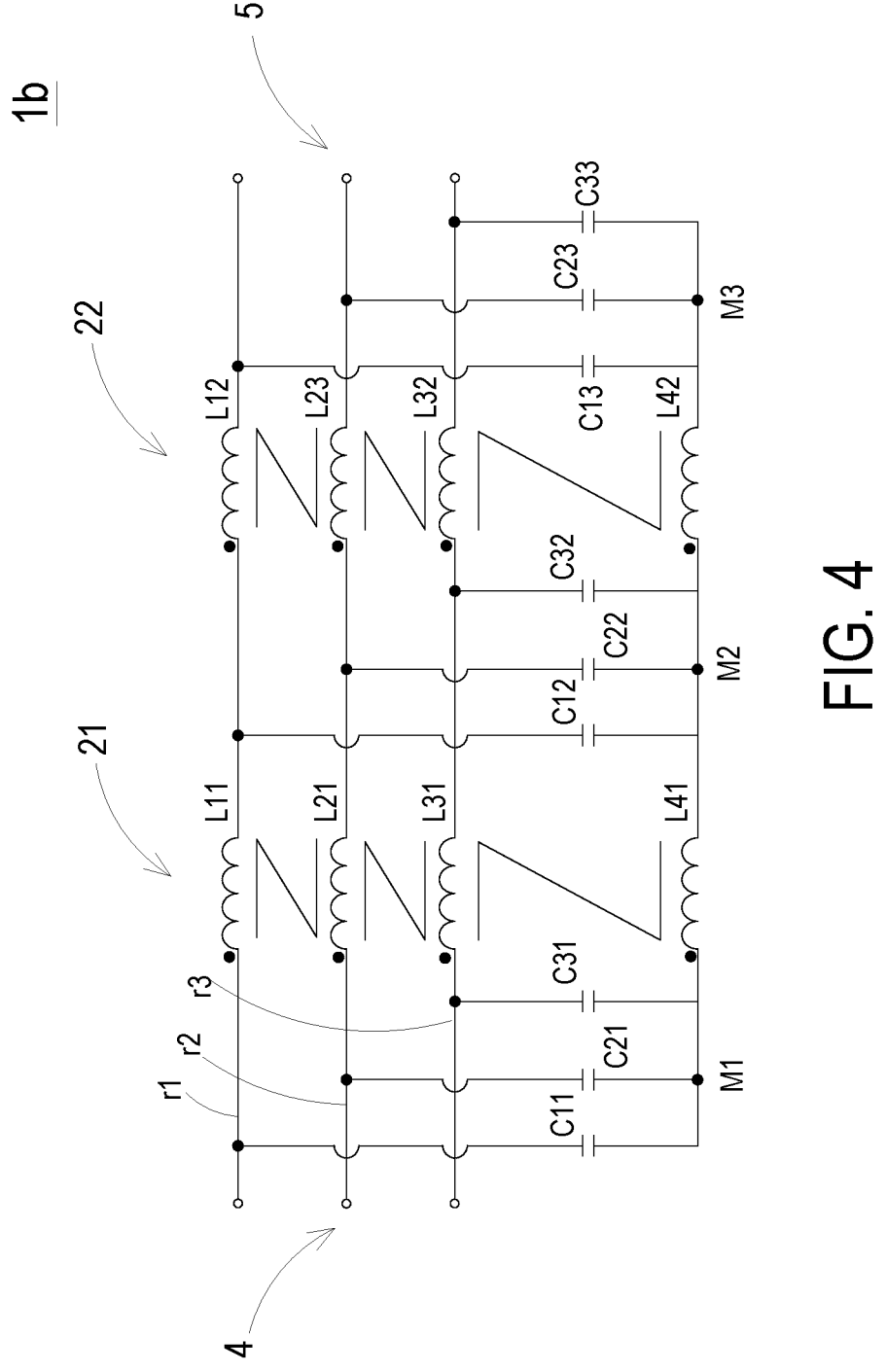
FIG. 4 is a schematic circuit diagram illustrating a filter system according to another embodiment of the present disclosure.

In the present disclosure, the filter system 1 is a (N+1)-stage filter circuit, where the specific value of N is not limited. For example, FIG. 3 shows the filter system 1a with N equal to 1, and the filter system 1a has one common mode choke 21, two first capacitors C11 and C12, two second capacitors C21 and C22 and two third capacitors C31 and C32. Therefore, the filter system 1a shown in FIG. 3 is a two-stage filter circuit. In addition, FIG. 4 shows the filter system 1b with N equal to 2, and the filter system 1b has two common mode chokes 21 and 22, three first capacitors C11, C12 and C13, three second capacitors C21, C22 and C23 and three third capacitors C31, C32 and C33. Therefore, the filter system 1b shown in FIG. 4 is a three-stage filter circuit.

Figure 5:
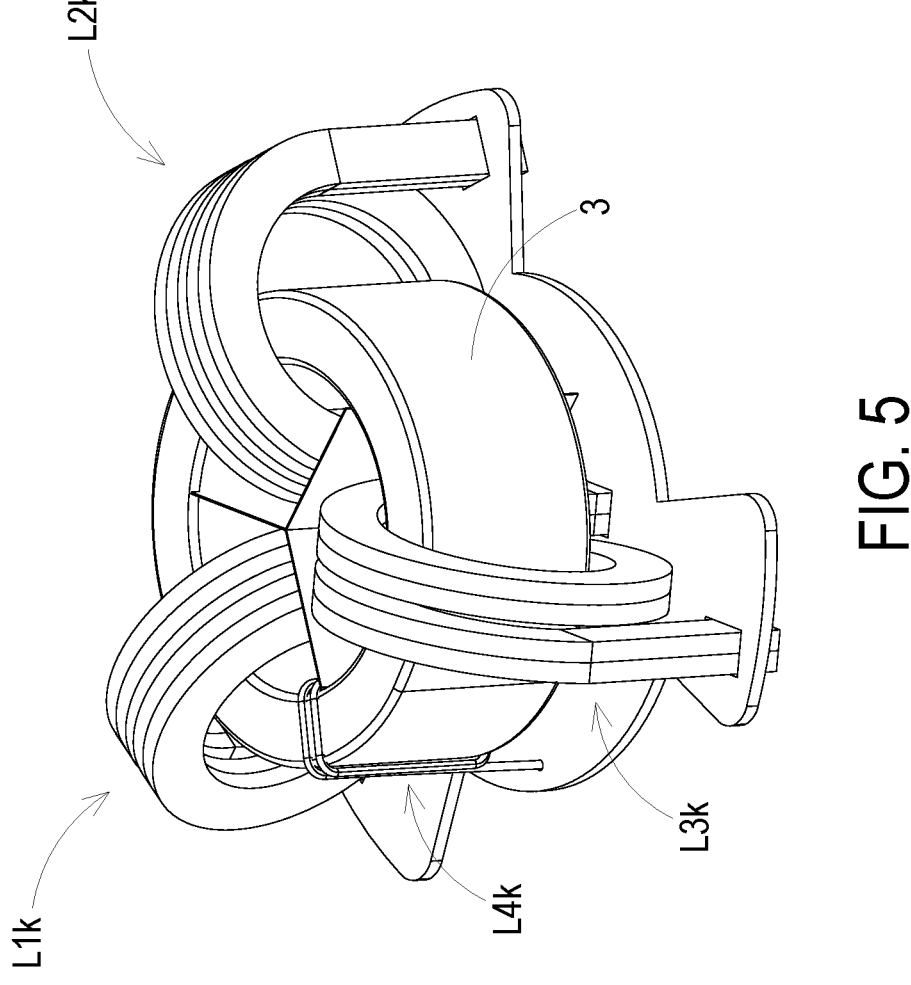
Figure 6:
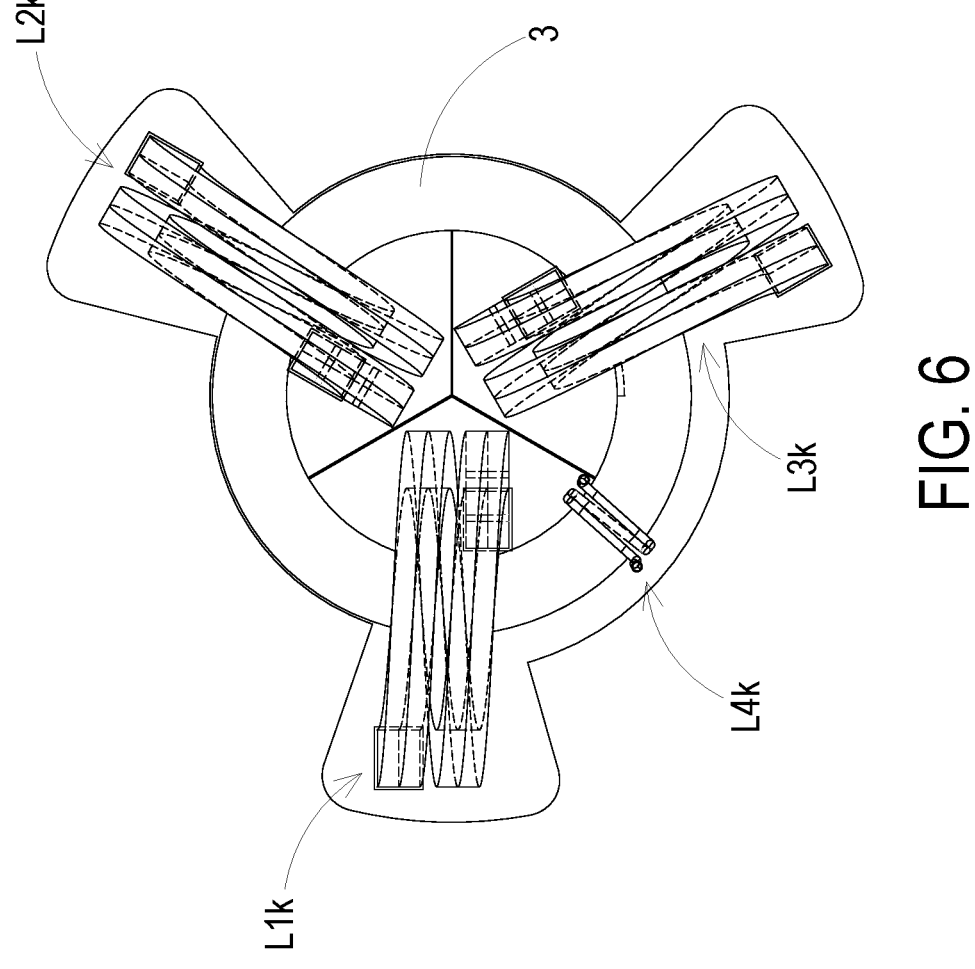
FIG. 6 is a top view of FIG. 5.

Please refer to FIGS. 5 and 6. FIG. 5 is a schematic perspective view illustrating the first winding, the second winding, the third winding and the auxiliary winding of the common mode choke shown in FIG. 2 and a magnetic core where these windings are wound on. FIG. 6 is a top view of FIG. 5. As shown in FIGS. 5 and 6, in the k-th common mode choke 2k, the first winding L1k, the second winding L2k, the third winding L3k and the auxiliary winding L4k are wound on a magnetic core 3. In the four windings L1k, L2k, L3k and L4k, since the current flowing through the auxiliary winding L4k is relatively small, the auxiliary winding L4k is allowed to adopt a wire with smaller size, which makes the size of the auxiliary winding L4k smaller than that of the first winding L1k, the second winding L2k and the third winding L3k. For example, the first winding L1k, the second winding L2k and the third winding L3k may be flat copper wires with specification of 8*3*2 mm³, and the auxiliary winding L4k may be an enameled wire with a diameter of 1.2 mm, but not limited thereto. Since the current passes through the auxiliary winding electrically connected the electrical midpoints is small, the size of the auxiliary winding is smaller than that of the independent inductor disposed between the electrical midpoints, so the cost is reduced.

Figure 7:
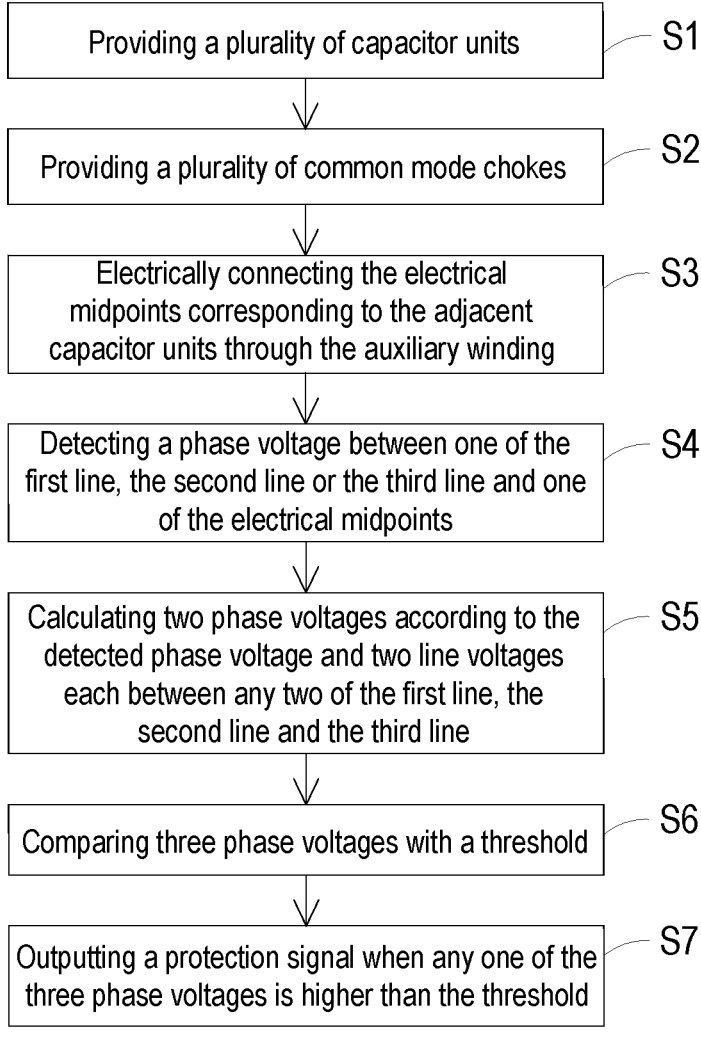
FIG. 7 is a schematic flow chart illustrating an X-capacitor protection method of a filter system according to an embodiment of the present disclosure.

FIG. 7 is a schematic flow chart illustrating an X-capacitor protection method of a filter system according to an embodiment of the present disclosure. The protection method of the present disclosure is applicable for the filter systems 1, 1a and 1b stated above. Please refer to FIG. 7, the X-capacitor protection method of the filter system is applicable for the three-phase three-wire power grid. The filter system includes a first line, a second line and a third line. The protection method of the present disclosure includes steps S1, S2, S3, S4, S5, S6 and S7. In the step S1, a plurality of capacitor units are provided, and each capacitor unit includes a first X capacitor, a second X capacitor and a third X capacitor. A terminal of the first X capacitor, a terminal of the second X capacitor and a terminal of the third X capacitor are electrically connected to the first line, the second line and the third line respectively. The other terminal of the first X capacitor, the other terminal of the second X capacitor and the other terminal of the third X capacitor are electrically connected to a corresponding electrical midpoint. In the step S2, a plurality of common mode chokes are provided, wherein each of the plurality of common mode chokes has an auxiliary winding. In the step S3, the electrical midpoints corresponding to the adjacent capacitor units are electrically connected to each other through the auxiliary winding. In the step S4, a phase voltage in a phase between one of the first line, the second line or the third line and one of the electrical midpoints is detected. In the step S5, two phase voltages in another two phases are calculated according to the detected phase voltage and two line voltages each between any two of the first line, the second line and the third line. In the step S6, the three phase voltages are compared with a threshold. And in the step S7, a protection signal is output when any one of the three phase voltages is higher than the threshold. Alternatively, in the step S5, two phase voltages in another two phases are calculated according to the detected phase voltage and two line voltages each between any two of the first line, the second line and the third line, and the capacitances of the first X capacitor, the second X capacitor and the third X capacitor are calculated according to the three phase voltages. Alternatively, in the step S6, the capacitances of the first X capacitor, the second X capacitor and the third X capacitor are compared with the threshold. Alternatively, in the step S7, a protection signal is output when the capacitance of any one of the X capacitors is less than the threshold.

From the above descriptions, a filter system and an X-capacitor protection method of the filter system is provided. In the filter system and the X-capacitor protection method of the filter system, all the electrical midpoints of capacitors are electrically connected to each other through windings of common mode chokes, thereby balancing the divided voltages of the capacitors in three phases and reducing the damage rate of the capacitors. In addition, since the winding for electrically connecting the electrical midpoints is one of the windings which form the common mode choke and the current passes therethrough is small, the size of the winding is smaller than that of the independent inductor disposed between the electrical midpoints, so the cost is reduced. Moreover, the detection unit only requires one phase voltage sampling unit for detecting a phase voltage, and the monitoring and protecting to all X capacitors are achieved. By detecting the voltages in three phases in real-time, the control unit can send a warning message to remind the user to maintain the system when a capacitance of a capacitor in a phase is attenuated, thereby achieving an early warning effect and avoiding the occurrence of the system failure.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A filter system, electrically coupled to a three-phase three-wire power grid, wherein the filter system comprises a first line, a second line and a third line, and the filter system comprises:

N common mode chokes, wherein each of the N common mode chokes comprises a first winding, a second winding, a third winding and an auxiliary winding, and N is a positive integer; and N+1 first capacitors, N+1 second capacitors and N+1 third capacitors, wherein in the k-th common mode choke, a first terminal and a second terminal of the first winding are electrically connected to a first terminal of the k-th first capacitor and a first terminal of the (k+1)-th first capacitor respectively, a first terminal and a second terminal of the second winding are electrically connected to a first terminal of the k-th second capacitor and a first terminal of the (k+1)-th second capacitor respectively, a first terminal and a second terminal of the third winding are electrically connected to a first terminal of the k-th third capacitor and a first terminal of the (k+1)-th third capacitor respectively, a second terminal of the k-th first capacitor, a second terminal of the k-th second capacitor and a second terminal of the k-th third capacitor are all electrically connected to a k-th electrical midpoint, a first terminal and a second terminal of the auxiliary winding of the k-th common mode choke are electrically connected to the k-th electrical midpoint and a (k+1)-th electrical midpoint respectively, and k is a positive integer less than or equal to N, wherein a phase voltage between the first line and the k-th electrical midpoint is equal to a phase voltage between the first line and the (k+1)-th electrical midpoint and is regarded as a first phase voltage, a phase voltage between the second line and the k-th electrical midpoint is equal to a phase voltage between the second line and the (k+1)-th electrical midpoint and is regarded as a second phase voltage, and a phase voltage between the third line and the k-th electrical midpoint is equal to a phase voltage between the third line and the (k+1)-th electrical midpoint M (k+1) and is regarded as a third phase voltage, wherein the filter system further comprises:

a detection unit, configured for detecting one of the first phase voltage, the second phase voltage and the third phase voltage; and a control unit, configured for receiving the phase voltage detected by the detection unit, obtaining the other two of the first phase voltage, the second phase voltage and the third phase voltage according to the phase voltage detected by the detection unit and two line voltages, comparing the first phase voltage, the second phase voltage and the third phase voltage with a threshold, and outputting a protection signal when any one of the first phase voltage, the second phase voltage and the third phase voltage is higher than the threshold, wherein a size of the auxiliary winding is smaller than a size of the first winding, the second winding and the third winding.

2. The filter system according to claim 1, wherein the first capacitors, the second capacitors and the third capacitors are X capacitors.

3. A filter system, electrically coupled to a three-phase three-wire power grid, wherein the filter system comprises a first line, a second line and a third line, and the filter system comprises:

a first capacitor unit and a second capacitor unit, wherein each of the first capacitor unit and the second capacitor unit comprises a first capacitor, a second capacitor and a third capacitor, a terminal of the first capacitor, a terminal of the second capacitor and a terminal of the third capacitor are electrically connected to the first line, the second line and the third line respectively, the other terminals of the first capacitor, the second capacitor and the third capacitor in the first capacitor unit are electrically connected to a first electrical midpoint, and the other terminals of the first capacitor, the second capacitor and the third capacitor in the second capacitor unit are electrically connected to a second electrical midpoint; and a common mode choke, electrically connected in series between the first capacitor unit and the second capacitor unit, wherein the common mode choke comprises an auxiliary winding electrically connected between the first electrical midpoint and the second electrical midpoint, wherein a phase voltage between the first line and the first electrical midpoint and a phase voltage between the first line and the second electrical midpoint are equal and regarded as a first phase voltage, a phase voltage between the second line and the first electrical midpoint and a phase voltage between the second line and the second electrical midpoint are equal and regarded as a second phase voltage, and a phase voltage between the third line and the first electrical midpoint and a phase voltage between the third line and the second electrical midpoint are equal and regarded as a third phase voltage, wherein the filter system further comprises:

a detection unit, configured for detecting one of the first phase voltage, the second phase voltage and the third phase voltage; and a control unit, configured for receiving the phase voltage detected by the detection unit, obtaining the other two of the first phase voltage, the second phase voltage and the third phase voltage according to the phase voltage detected by the detection unit and two line voltages, comparing the first phase voltage, the second phase voltage and the third phase voltage with a threshold, and outputting a protection signal when any one of the first phase voltage, the second phase voltage and the third phase voltage is higher than the threshold, wherein the common mode choke further comprises three main windings, and a size of the auxiliary winding is smaller than a size of any one of the three main windings.

4. The filter system according to claim 3, wherein the first capacitors, the second capacitors and the third capacitors are X capacitors.

5. An X-capacitor protection method of a filter system applicable for a three-phase three-wire power grid, wherein the filter system comprises a first line, a second line and a third line, and the X-capacitor protection method comprises steps of:

providing a plurality of capacitor units, wherein each of the plurality of capacitor units comprises a first X capacitor, a second X capacitor and a third X capacitor, a terminal of the first X capacitor, a terminal of the second X capacitor and a terminal of the third X capacitor are electrically connected to the first line, the second line and the third line respectively, the other terminal of the first X capacitor, the other terminal of the second X capacitor and the other terminal of the third X capacitor are all electrically connected to a corresponding electrical midpoint;

providing a plurality of common mode chokes, wherein each of the plurality of common mode chokes has an auxiliary winding; and electrically connecting the electrical midpoints corresponding to the adjacent capacitor units through the auxiliary winding, wherein the X-capacitor protection method further comprises steps of:

detecting a phase voltage in a phase between one of the first line, the second line or the third line and one of the electrical midpoints;

calculating two phase voltages in other two phases according to the detected phase voltage and two line voltages;

comparing the three phase voltages with a first threshold; and outputting a protection signal when any one of the three phase voltages is higher than the first threshold, wherein each of the plurality of common mode chokes further comprises three main windings, and a size of the auxiliary winding is smaller than a size of any one of the main windings.

6. The X-capacitor protection method according to claim 5, further comprising steps of:

calculating a capacitance of the first X capacitor, a capacitance of the second X capacitor, a capacitance of the third X capacitor according to the three phase voltages;

comparing the capacitance of the first X capacitor, the capacitance of the second X capacitor, the capacitance of the third X capacitor with a second threshold; and outputting the protection signal when any one of the capacitances of the X capacitors is less than the second threshold.

* * * * *